United States Patent [19]
Baker et al.

[11] Patent Number: 5,404,727
[45] Date of Patent: Apr. 11, 1995

[54] MANUFACTURE OF CHEMICALS

[75] Inventors: Terence P. Baker, Rushden; Rodney D. Bee, St. Neots, both of United Kingdom

[73] Assignee: Good Humor Corporation, Englewood Cliffs, N.J.

[21] Appl. No.: 93,214

[22] Filed: Jul. 19, 1993

[30] Foreign Application Priority Data

Jul. 20, 1992 [EP] European Pat. Off. ............ 92306635

[51] Int. Cl.$^6$ ................................................. F25C 1/00
[52] U.S. Cl. ................................................. 62/69; 62/1
[58] Field of Search ........................... 62/1, 68, 69, 345

[56] References Cited

U.S. PATENT DOCUMENTS

| | | | |
|---|---|---|---|
| 3,217,503 | 11/1965 | Mitchell et al. | 62/48 |
| 3,220,204 | 11/1965 | Adler et al. | 62/70 |
| 4,139,992 | 2/1979 | Fraser | 62/345 |
| 4,347,707 | 9/1982 | Zemelman et al. | 62/69 |
| 4,393,660 | 7/1983 | Kleiner et al. | 62/69 |
| 4,487,023 | 12/1984 | Hegadorn et al. | 62/1 |

FOREIGN PATENT DOCUMENTS 594562 3/1934 Germany.

*Primary Examiner*—William E. Tapolcai
*Attorney, Agent, or Firm*—James J. Farrell

[57] ABSTRACT

Producing edible gas hydrate by combining an aqueous liquid and a hydrate forming gas in a condensed state at a pressure above the minimum hydrate forming pressure but at a temperature above the maximum hydrate formation temperature, thereafter contacting the liquid with a surface having a temperature below said maximum temperature and moving the liquid with respect to said surface.

9 Claims, 1 Drawing Sheet

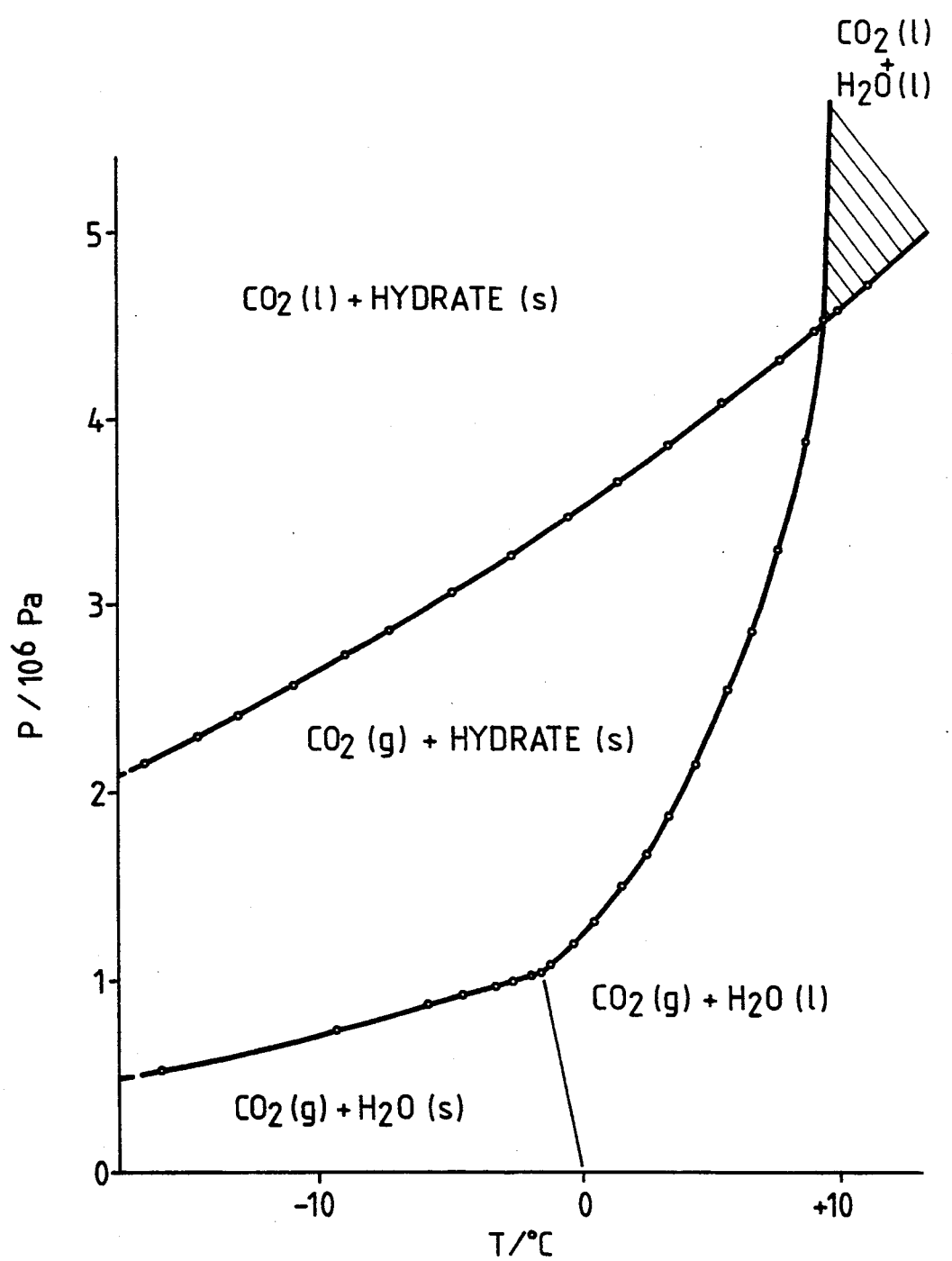

MANUFACTURE OF CHEMICALS

The invention relates to the manufacture of edible clathrates and more precisely the manufacture of solid gas hydrates.

Various methods for manufacturing clathrates are known in the art, for example from U.S. Pat. Nos. 4,347,707, 4,487,023 and 3,217,503, but these methods all require a careful control of the reaction conditions and, what is more important, complicated and expensive equipment. Moreover the composition of the final product cannot easily be controlled, in particular not for the higher gas contents.

The invention remedies these problems by providing a method requiring only the simplest of pressure vessels and by utilisation of commonly existing freezing facilities. To that end, the invention provides a method according to the main claim.

In this method preferably mixtures of the clathrate forming species are used, in the condensed and in particular in the liquid state and for obtaining the highest gas contents in approximately the ratio prescribed by the stoichiometric formula for the clathrates being prepared, e.g. $5.75H_2O.CO_2$ for $CO_2$ gas hydrate. In practice this means that the liquid having the gas dissolved therein is in equilibrium with liquified gas. For obtaining high activity gas hydrates preferably a stoichiometric amount $+$or $-50\%$ and more preferred $+$or $-10\%$ is used. To prevent gas losses during manufacture in practice gas amounts ranging between below and up to stoichiometric amounts are used.

Suitable temperature and pressure conditions can be derived from the phase diagram of the respective gas-aqueous liquid combination, which, if not available in the literature, can be determined in a manner known per se.

FIG. 1 is a phase diagram of an edible gas hydrate of the invnetion.

In each case, the initial mixture will be prepared above the temperature and pressure that liquid gas hydrate forming gas co-exist with gaseous gas hydrate forming gas and with liquid and gaseous water but at which solid gas hydrate cannot be formed. For a frequently used edible clathrate $CO_2$-$H_2O$ hydrate the minimum pressure for the initial mixture is $44.10^5$ Pa and the minimum temperature is $283.5°$ K. ($10.2°$ C.) as can be seen in the phase diagram as shown in FIG. 1. With other words, the initial mixture should be in the hatched area in said phase diagram.

In a preferred embodiment a calculated amount of water is filled into a tubular pressure vessel, a calculated amount of hydrate forming gas in a condensed condition is also added and the vessel is closed. Typically, these amounts are calculated such that the vessel will be ½ to ⅔ filled. The vessel and contents are retained at a temperature above the clathrate forming temperature and at a pressure sufficient to retain some hydrate forming gas in the liquid state throughout, e.g. for preparation of $CO_2$-$H_2O$ clathrate, above the carbon dioxide liquidous line in the presence of liquid water but at temperature sufficient to prevent the formation of solid gas hydrate.

The reaction to produce solid gas hydrate is then made to proceed by rotating the reaction vessel about its longitudinal axis whilst cooling the walls. Cooling may be provided by a commercial blast freezer, a cold store, or any convenient method of heat withdrawal to a temperature below the clathrate forming temperature. The arrangement described promotes nucleation of solid gas hydrate on the metal surface whilst it is not in contact with the bulk liquids thereby producing smooth growth of the solid on the surface of the pressure vessel. Products being mixtures of ice and solid gas hydrate result when water is used in excess. Using liquid mixtures near the stoichiometric ratio produce predominantly gas hydrate. For obtaining a clathrate close to the theoretical maximum gas content preferably the method as described in Example 1 is applied. Where found to be advantageous, products lower in gas hydrate content can be prepared by the method described in Example 2.

It is advantageous in cost of pressure vessel that it is mainly cylindrical, which vessel in respect of the surface area for cooling and nucleation of the reaction, has a high ratio of length to diameter, i.e. at least 5:1 and preferably 10:1 or more. In this regard should be remarked that slightly, say internally up to 20% tapering pressure vessels can be used as well, what is intended to be encompassed by the expression "mainly cylindrical", although exactly cylindrical is to be preferred for cost reasons. Thus rotating the vessel provides a cooled film which provides nucleation of the thermodynamically favoured phase.

For the reaction to be conducted in a controlled manner and so as to give a required product it is also greatly beneficial to both stir the contained liquid but also to cause the reaction to take place progressively in a thin film which is progressively built up at the surface of the reaction vessel.

Other preferred embodiments are as being described in the sub claims.

That cooling/freezing can be provided by existing refrigeration facilities provides a further benefit. The invention combines all the above advantages.

Having generally described the invention, practical examples elucidating the preparation of $CO_2$ and $N_2O$ hydrate respectively will be described to illustrate the method which may be applied to other desirable gas hydrates as well.

EXAMPLE 1

30 kg distilled water at ambient temperature and 12.75 kg liquid $CO_2$ is filled into a tubular stainless steel vessel, of internal length 300 cm, having a capacity of 90 liters. Thereafter, the contents are equilibrated at 286.3 K. Subsequently the vessel is put in a cold store at 248.3 K. Whilst being cooled the vessel is laid horizontally and constantly rotated about its longitudinal axis. After 6 hours the vessel is removed from the freezer, the excess gas pressure is released and the vessel opened. The contents are removed from the vessel by rapidly heating the metal vessel so as to remove the hollow ingot under gravity. The solid product is kept at 253° K. and reduced in size by means of a hammer mill. The final product contained in excess of 100 ml $CO_2 g^{-1}$ present as the gas, hydrate.

EXAMPLE 2

11.8 kg of water at 288° K. and 4.2 kg nitrous oxide at a pressure sufficient to liquify it at that temperature was added to a tubular pressure vessel with an internal diameter of 14 cm and internal length of 200 cm. The vessel was sealed. The cylindrical vessel was laid horizontally and rotated about its major axis by means of a series of driven rollers, whilst being passed through a blast freezer at 233.3° K. Residence time in the blast freezer was 45 minutes. After removal from the freezer the vessel was vented to restore atmospheric pressure within. Having been raised to a vertical position and the base of the vessel removed the external surfaces were heated rapidly. The product which was mixture of nitrous oxide gas hydrate and water ice was crushed to coarse particles whilst being maintained at 248.3° K. When caused to decompose by being heated to 293.3° K. in excess of 50 ml of $N_2O$ gas at atmospheric temperature and pressure was released per gram of product.

We claim:

1. A method of producing an edible gas hydrate which comprises combining an aqueous liquid, including pure water, and an edible gas hydrate forming gas at a pressure sufficiently high to form a gas hydrate, but at a temperature preventing said formation, and thereafter reducing the temperature to form the solid gas hydrate, characterized in that the aqueous liquid as a continuous phase having the gas dissolved therein, is contacted with a surface which is at a temperature sufficiently low to form the solid gas hydrate while maintaining the liquid in movement with respect to the said surface.

2. The method of claim 1, characterized in that the liquid having the gas dissolved therein is in equilibrium with liquified gas.

3. The method of claim 1, characterized in that the aqueous liquid and the gas in a condensed condition are put in a vessel and pressurised, the wall of the vessel is cooled to below the clathrate forming temperature and the liquid and vessel wall are made to move with respect to each other.

4. The method of claim 1, characterized in that an amount of an aqueous liquid and about a stoichiometric amount of the hydrate forming gas are arranged in a pressure vessel, which is closed, the vessel is kept at a temperature above the maximum clathrate forming temperature, and thereafter the temperature of the vessel is reduced to below the maximum clathrate forming temperature, the amount of gas and the capacity of the vessel being such that a pressure is obtained sufficient for clathrate forming.

5. The method of claim 4, characterized in that a stoichiometric amount + or −50% and preferably + or −10% is used.

6. The method of claim 4, characterized in that gas amounts ranging between below and up to stoichiometric amounts are used.

7. The method of claim 1 which is effected in a mainly cylindrical vessel.

8. The method according to claim 7, characterized in that the vessel has a length to diameter ratio of at least 5:1 and preferably of at least 10:1.

9. The method according to claim 7, characterized in that the vessel is rotated about its longitudinal axis and in a horizontal position.

* * * * *